United States Patent
Singnurkar

(10) Patent No.: US 9,035,638 B2
(45) Date of Patent: May 19, 2015

(54) DC/DC CONVERTER ARRANGEMENT AND METHOD FOR DC/DC CONVERSION

(75) Inventor: Pramod Singnurkar, Graz (AT)

(73) Assignee: ams AG, Unterpremstaetten (AT)

( * ) Notice: Subject to any disclaimer, the term of this patent is extended or adjusted under 35 U.S.C. 154(b) by 1274 days.

(21) Appl. No.: 12/674,349

(22) PCT Filed: Aug. 20, 2008

(86) PCT No.: PCT/EP2008/060891
§ 371 (c)(1),
(2), (4) Date: May 2, 2011

(87) PCT Pub. No.: WO2009/024584
PCT Pub. Date: Feb. 26, 2009

(65) Prior Publication Data
US 2011/0199062 A1    Aug. 18, 2011

(30) Foreign Application Priority Data
Aug. 20, 2007 (EP) .................................... 07016310

(51) Int. Cl.
*G05F 1/00* (2006.01)
*H02M 3/158* (2006.01)

(52) U.S. Cl.
CPC .................................... *H02M 3/1582* (2013.01)

(58) Field of Classification Search
CPC .................................................... H03M 3/156
USPC ......... 323/282, 283, 284, 285, 222, 223, 224, 323/257, 258, 259, 241, 288, 312, 225, 323/271; 363/34, 37, 71, 89, 97
See application file for complete search history.

(56) References Cited

U.S. PATENT DOCUMENTS

| 4,837,495 A | 6/1989 | Zansky |
| 4,975,820 A * | 12/1990 | Szepesi ..................... 363/21.17 |

(Continued)

FOREIGN PATENT DOCUMENTS

| CN | 1879285 A | 12/2006 |
| EP | 1 388 927 | 8/2003 |

(Continued)

OTHER PUBLICATIONS

C.K. Tse et al., "Control of bifurcation in current-programmed DC/DC converters: an alternative viewpoint of ramp compensation", Industrial Electronics Society, vol. 4, pp. 2413-2414, Oct. 22, 2000.

(Continued)

*Primary Examiner* — Matthew Nguyen
*Assistant Examiner* — Trinh Dang
(74) *Attorney, Agent, or Firm* — McDermott Will & Emery LLP

(57) ABSTRACT

A DC/DC converter arrangement includes an input terminal to receive a supply voltage, an output terminal to provide an output voltage and a switching arrangement, including a coil and at least two switches to provide a Buck-Boost conversion. The arrangement further includes a current detection circuit which is coupled to the switching arrangement for sensing a coil current and a comparator, including a first input which is coupled to the output terminal and a second input which is coupled to an output of the current detection circuit. An output of the comparator is coupled to the switching arrangement. Furthermore, the arrangement includes a ramp generator which is coupled to the first or the second input of the comparator.

18 Claims, 9 Drawing Sheets

(56) References Cited

U.S. PATENT DOCUMENTS

| | | | |
|---|---|---|---|
| 5,402,060 | A | 3/1995 | Erisman |
| 5,479,090 | A * | 12/1995 | Schultz ................ 323/284 |
| 6,037,755 | A | 3/2000 | Mao et al. |
| 6,069,807 | A | 5/2000 | Boylan |
| 6,087,816 | A | 7/2000 | Volk |
| 6,166,527 | A | 12/2000 | Dwelley et al. |
| 6,246,222 | B1 | 6/2001 | Nilles et al. |
| 6,275,016 | B1 | 8/2001 | Ivanov |
| 6,717,388 | B2 | 4/2004 | Smidt |
| 6,788,033 | B2 | 9/2004 | Vinciarelli |
| 6,828,836 | B1 * | 12/2004 | Barrow et al. ............ 327/172 |
| 6,930,526 | B1 | 8/2005 | Silva |
| 7,116,085 | B2 | 10/2006 | Ikezawa |
| 7,176,667 | B2 | 2/2007 | Chen et al. |
| 7,205,751 | B2 * | 4/2007 | Rudiak ................ 323/271 |
| 7,256,570 | B2 * | 8/2007 | Zhou et al. ............ 323/224 |
| 7,378,823 | B2 | 5/2008 | Yamanaka et al. |
| 7,466,112 | B2 | 12/2008 | Zhou et al. |
| 7,570,033 | B1 * | 8/2009 | Ju ................ 323/259 |
| 7,612,545 | B2 | 11/2009 | Umemoto et al. |
| 7,944,191 | B2 | 5/2011 | Xu |
| 8,179,113 | B2 | 5/2012 | Singnurkar |
| 2002/0190698 | A1 | 12/2002 | Smidt et al. |
| 2004/0046535 | A1 | 3/2004 | Duffy et al. |
| 2004/0090804 | A1 | 5/2004 | Lipcsei et al. |
| 2005/0093526 | A1 | 5/2005 | Notman |
| 2005/0110475 | A1 * | 5/2005 | Chapuis ................ 323/282 |
| 2006/0022648 | A1 * | 2/2006 | Ben-Yaakov et al. ....... 323/222 |
| 2006/0284606 | A1 * | 12/2006 | Chen et al. ............ 323/259 |
| 2007/0085519 | A1 * | 4/2007 | Xu ................ 323/282 |

FOREIGN PATENT DOCUMENTS

| | | |
|---|---|---|
| EP | 2 009 776 | 6/2007 |
| EP | 1 804 368 | 7/2007 |
| WO | WO 2007/021282 | 2/2007 |

OTHER PUBLICATIONS

Unitrode Corp., "Modeling, Analysis and Compensation of the Current Mode Converter", Unitrode Application Note, http://focus.ti.com/lit/an/slua101/slua101.pdf, Dec. 31, 1999.

Gaboriault, M. et al.: "A High Efficiency, Non-Inverting, Buck-Boost DC-DC Converter"—Sep. 27, 2004, IEEE, APEC'04, 1411-1415.

B. Mannnano, "Current Sensing Solutions for Power Supply Designers", Texas Instruments Inc., pp. 1-1 to 1-34, 2001.

N. Mohan et al., "Power Electronics: Converters, Applications and Design", ISBN 0-471-50537*4, John Wiley & Sons, pp. 257, 651-652, 1989.

B. Sahu et al., "A Low Voltage, Dynamic, Noninverting, Synchronous Buck-Boost Converter for Portable Applications", IEEE Transactions on Power Electronics, vol. 19, No. 2, pp. 443-452, Mar. 2004.

* cited by examiner

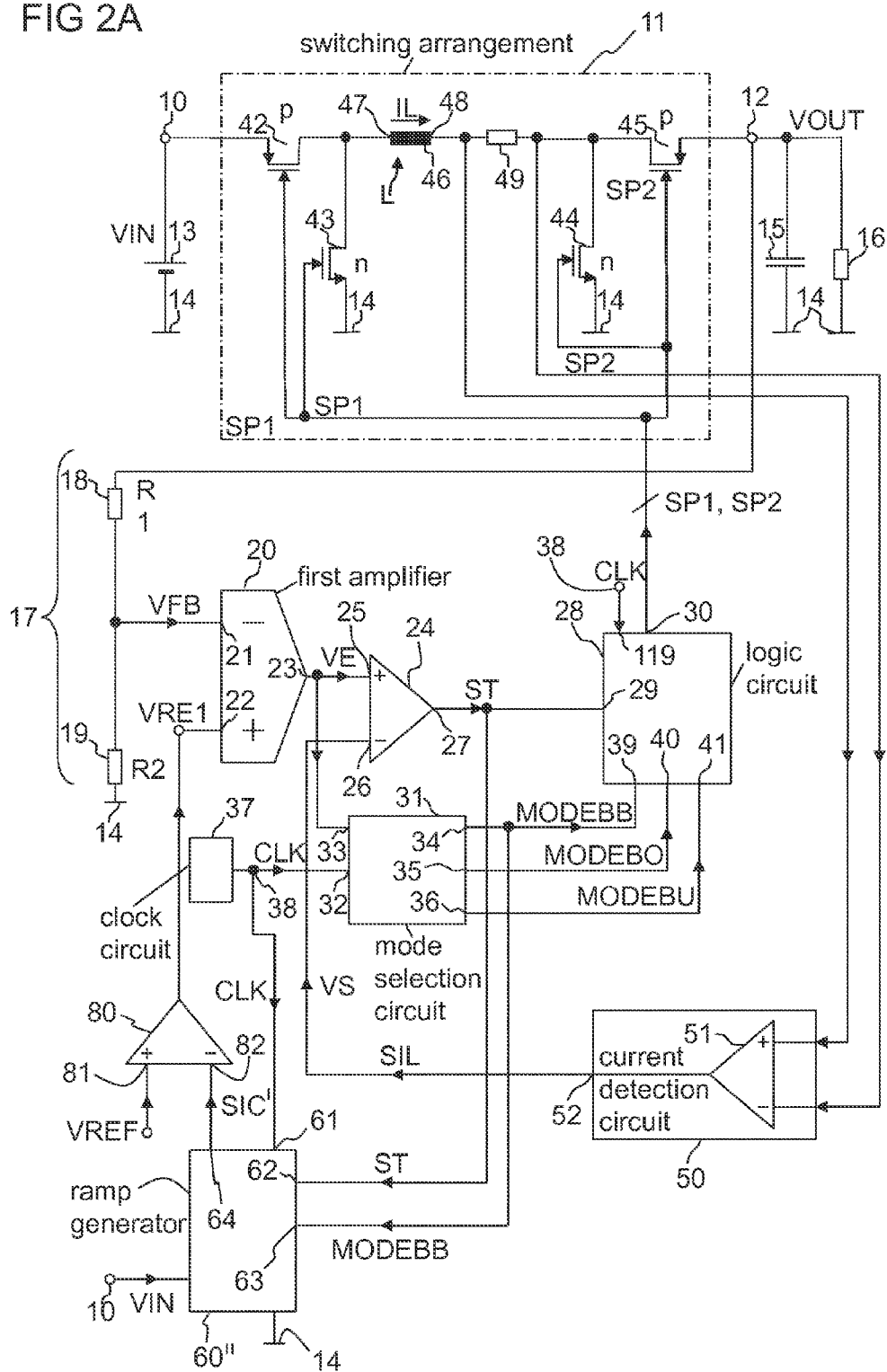

Buck-Boost mode

| SP1 | SP2 | Duration | Switching Phase | Switch |
|---|---|---|---|---|
| LOW | LOW | tp2 | A | 42,45 on<br>43,44 off |
| LOW | HIGH | td1 | B | 42,44 on<br>43,45 off |
| LOW | LOW | tp1 | C | 42,45 on<br>43,44 off |
| HIGH | LOW | td2 | D | 43,45 on<br>42,44 off |

FIG 3C
Boost mode
| SP1 | SP2 | Duration | Switching Phase | Switch |
|---|---|---|---|---|
| LOW | HIGH | tu | B | 42,44 on 43,45 off |
| LOW | LOW | T-tu | A | 42,45 on 43,44 off |
FIG 3D
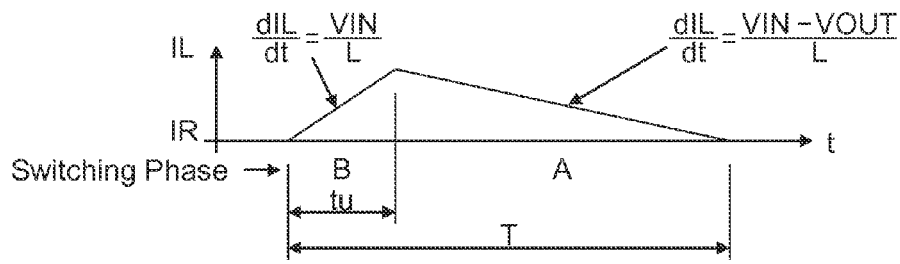
FIG 3E
Buck mode
| SP1 | SP2 | Duration | Switching Phase | Switch |
|---|---|---|---|---|
| LOW | LOW | td | A | 42,45 on 43,44 off |
| HIGH | LOW | T-td | D | 43,45 on 42,44 off |
FIG 3F
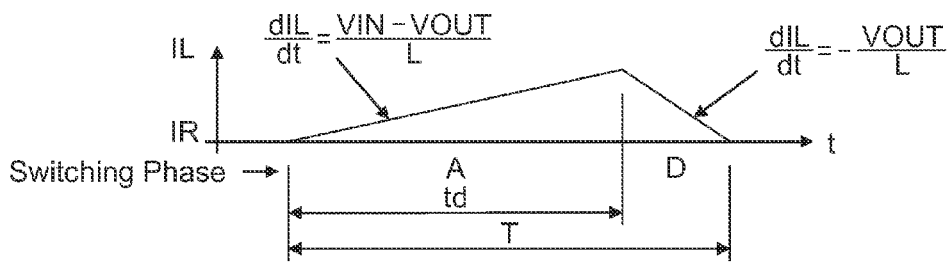

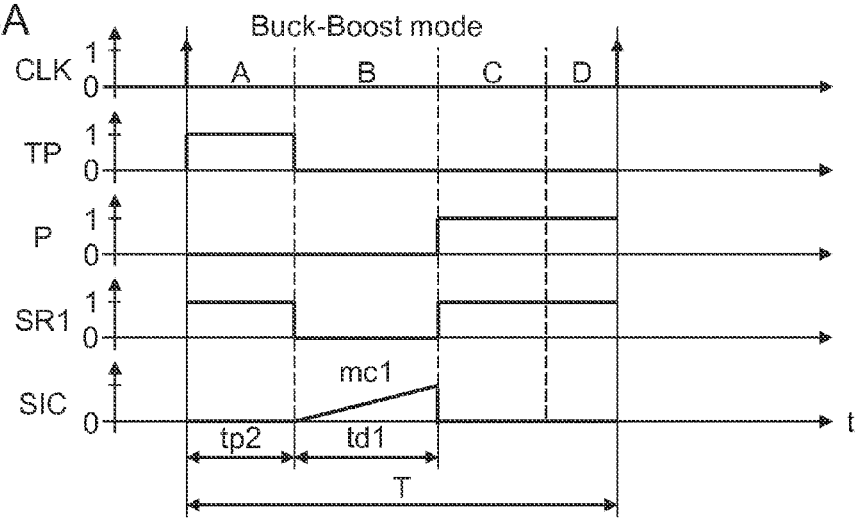
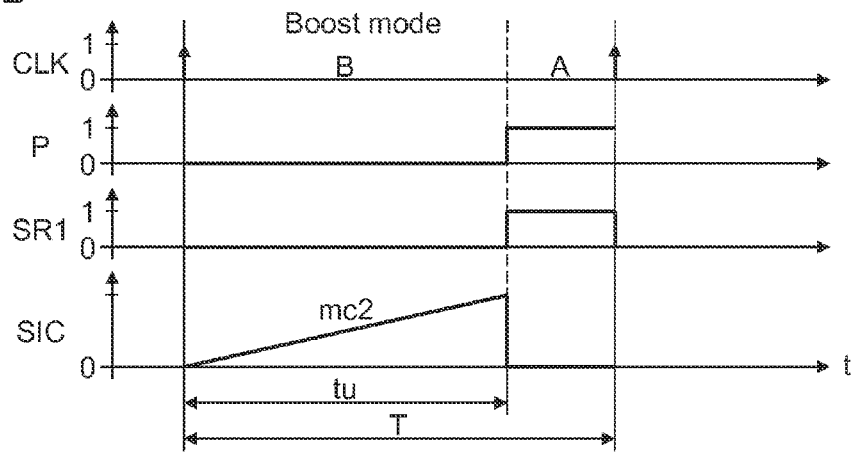
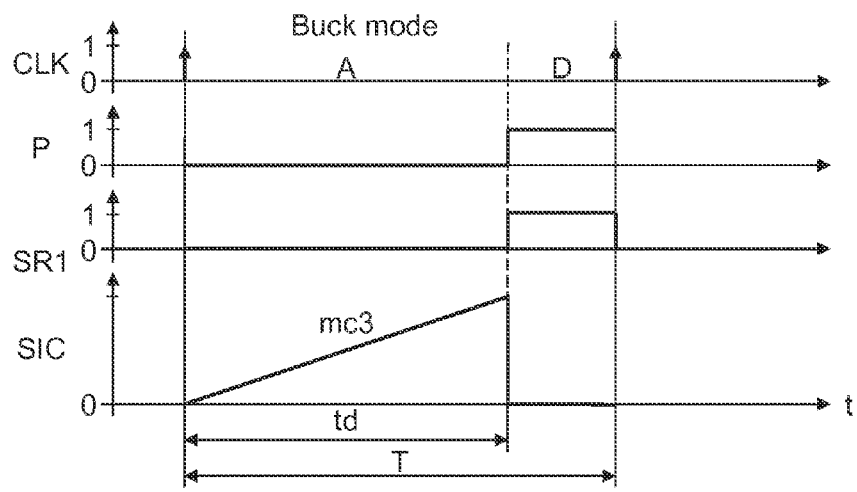

DC/DC CONVERTER ARRANGEMENT AND METHOD FOR DC/DC CONVERSION

RELATED APPLICATIONS

This is a U.S. national stage of application No. PCT/EP2008/060891, filed on Aug. 20, 2008.

This application claims the priority of European application no. 07016310.0 filed Aug. 20, 2007, the entire content of which is hereby incorporated by reference.

FIELD OF THE INVENTION

The present invention relates to a DC/DC converter arrangement and a method for DC/DC conversion.

BACKGROUND OF THE INVENTION

DC/DC converter arrangements are common to provide an output voltage by up-conversion of a supply voltage or down-conversion of a supply voltage. DC/DC converter arrangements are, for example, used in devices for mobile communication and digital cameras. A DC/DC converter using a Buck mode of operation is used for down-conversion of the supply voltage, whereas a DC/DC converter using a Boost mode of operation is used for up-conversion of the supply voltage. If the supply voltage is nearly the same as the output voltage, then a Buck-Boost mode of operation can by used.

Document EP 1804368 A1 shows a DC/DC converter with a Buck, a Boost and a Buck-Boost mode of operation.

A Buck-converter with a slope compensation is described in "Modelling, Analysis and Compensation of the Current-Mode Converter", Unitrode Application Note U-97, Unitrode Corporation.

SUMMARY OF THE INVENTION

It is an object of the present invention to provide a DC/DC converter arrangement and a method for DC/DC conversion with a high stability.

In one embodiment, a DC/DC converter arrangement comprises an input terminal, an output terminal and a switching arrangement which couples the input terminal to the output terminal. The switching arrangement comprises a coil and at least two switches. Furthermore, the DC/DC converter arrangement comprises a current detection circuit which is coupled to the switching arrangement. Moreover, the DC/DC converter arrangement comprises a comparator. A first input of the comparator is coupled to the output terminal. Further on, a second input of the comparator is coupled to an output of the current detection circuit. An output of the comparator is coupled to the switching arrangement. Additionally, the DC/DC converter arrangement comprises a ramp generator which is coupled to the first or to the second input of the comparator.

A supply voltage is applied to the input terminal. An output voltage is provided at the output terminal by the switching arrangement. The coil and the at least two switches of the switching arrangement generate the output voltage by a Buck-Boost conversion of the supply voltage. A coil current is detected by the current detection circuit. At least one of the switches of the switching arrangement is controlled depending on a result of the comparison which is performed by the comparator.

The ramp generator advantageously provides a stabilization of the Buck-Boost conversion of the switching arrangement. The stabilization of the coil current can advantageously be achieved by shortening a switching phase in which the coil current rises with a high slope.

In an embodiment, the switching arrangement, comprising the coil and at least two switches, provides the output voltage at a certain point of time in one mode of operation which can be a Buck-Boost mode of operation and the Boost mode of operation. Alternatively, the switching arrangement is in one mode of operation which is either the Buck-Boost mode of operation or a Buck mode of operation at a certain point of time. Preferably at a certain point of time, the switching arrangement is in a mode of operation out of a group which comprises the Buck-Boost mode of operation, the Buck mode of operation, and the Boost mode of operation.

The DC/DC converter arrangement may be adapted to provide three different modes of operation that is the Buck-Boost mode of operation, the Buck mode of operation and the Boost mode of operation. If the switching arrangement is in the Buck-Boost mode of operation then the DC/DC converter arrangement is in the Buck-Boost mode of operation. Similarly, if the DC/DC converter arrangement is in the Buck mode or the Boost mode of operation, then the switching arrangement is also in the Buck mode respectively in the Boost mode of operation.

In an embodiment, the ramp generator generates a ramp signal such that a slope of the ramp signal depends on the mode of operation of the DC/DC converter arrangement. Thus, the stability of the voltage conversion is improved.

In an embodiment, the current detection circuit generates a current signal. The coil current is a current that flows through the coil.

In an embodiment, the ramp generator provides the ramp signal with a ramp form. The ramp signal is periodically generated. The ramp signal comprises one ramp in a clock cycle. The ramp signal preferably comprises the maximum of one ramp in the clock cycle. A comparator signal is provided by the comparator depending on the output voltage, the current signal and the ramp signal.

Preferably, the ramp signal rises during a switching phase of a plurality of switching phases of the Buck-Boost mode of operation and is constant during at least a further switching phase of the plurality of switching phases of the Buck-Boost mode of operation. Therefore, the power consumption of the DC/DC converter arrangement may be reduced.

In an embodiment, the ramp signal has a slope which is different from zero in one switching phase of a plurality of switching phases of the Buck-Boost mode of operation. The ramp signal has a constant value in a further switching phase of the plurality of switching phases of the Buck-Boost mode of operation. The ramp signal may have a slope which is different from zero in one switching phase of the Buck mode of operation, and in one switching phase of the Boost mode of operation. Further on, the ramp signal has a constant value in a further switching phase of the Buck mode of operation and the Boost mode of operation. The power consumption may advantageously be reduced because the ramp signal does not increase in all switching phases of the different phases in a cycle.

The slope of the ramp signal may be different from zero in that switching phase of a cycle which has a controllable duration. The ramp signal may have a constant value in at least one switching phase of a cycle. The ramp signal may have a constant value in a switching phase which has a pre-determined duration. The constant value may be zero. Thus, the ramp signal may not have a slope in every switching phase of the different switching phases of the DC/DC conversion.

The slope of the ramp signal may be a function of the supply voltage and the output voltage.

In one embodiment, the ramp generator comprises an output current source. An output of the output current source is connected to an output of the ramp generator. The output of the ramp generator may be coupled to the second input of the comparator. The DC/DC converter arrangement may comprise a first resistor which couples the second input of the comparator to a reference potential terminal. Thus, an effective way for adding the ramp signal, which is generated by the ramp circuit, and the current signal, which is generated by the current detection circuit, is achieved.

In a further development, the DC/DC converter arrangement comprises a first resistor which couples the second input of the comparator to a reference potential terminal. The output of the ramp generator is connected to the second input of the comparator. The ramp generator provides the ramp signal in the form of a current to a first terminal of the resistor. Additionally, the current detection circuit also provides the current signal in the form of a current to the first terminal of the resistor. Thus a sense voltage which is applied to the second input of the comparator is generated by a voltage drop across the first resistor to which the sum of the ramp signal and the current signal is provided. The sense voltage can be increased by adding the ramp signal to the current signal in one of the switching phases of the Buck-Boost conversion, so that the comparator triggers a switching from said switching phase to a next switching phase at an earlier point of time in comparison with a DC/DC converter arrangement without a ramp generator. A cost effective addition of the ramp signal and the current signal is achieved by the first resistor.

According to an aspect of the invention, a method for DC/DC conversion comprises converting a supply voltage to an output voltage by a operating in a Buck-Boost mode of operation using a coil. Moreover, a current signal by sensing of a coil current and a ramp signal are provided. Furthermore, an error voltage which depends on the output voltage of the Buck-Boost conversion is compared with a sense voltage which depends on the current signal and the ramp signal or, alternatively, an error voltage which depends on the output voltage and the ramp signal is compared with a sense voltage which depends on the current signal. A comparator signal is generated depending of the result of the comparison. Further on, the comparator signal controls the conversion using the Buck-Boost mode of operation.

It is an advantage of the ramp signal that a high stability of the Buck-Boost conversion is achieved by reducing a rise of a peak value of the coil current.

In an embodiment, a supply voltage is converted to an output voltage using a coil in either the Buck-Boost mode of operation or a Boost mode of operation. Alternatively, the supply voltage is converted the output voltage using a coil in the Buck-Boost mode of operation or a Buck mode of operation. Preferably, the supply voltage is converted to an output voltage in one of the group of operations which comprises the Buck-Boost mode of operation, the Boost mode of operation, and the Buck mode of operation.

In an embodiment, the ramp signal is generated such that a slope of the ramp signal depends on the mode of operation.

BRIEF DESCRIPTION OF THE DRAWINGS

The following description of figures of exemplary embodiments may further illustrate and explain the invention. Devices with the same structure and the same effect, respectively, appear with equivalent reference symbols. Insofar as circuits or devices correspond to one another in terms of their function in different figures, the description thereof is not repeated for each of the following figures.

FIGS. 2A to 2C show an alternative exemplary embodiment of a DC/DC converter arrangement and two exemplary embodiments of a ramp generator of the invention, FIGS. 3A to 3F show exemplary embodiments of a Buck-Boost mode, a Boost mode and a Buck mode of operation of the invention, FIGS. 4A to 4C show exemplary embodiments of signals of a ramp generator of the invention.

DETAILED DESCRIPTION OF THE DRAWINGS

Figure 1A:
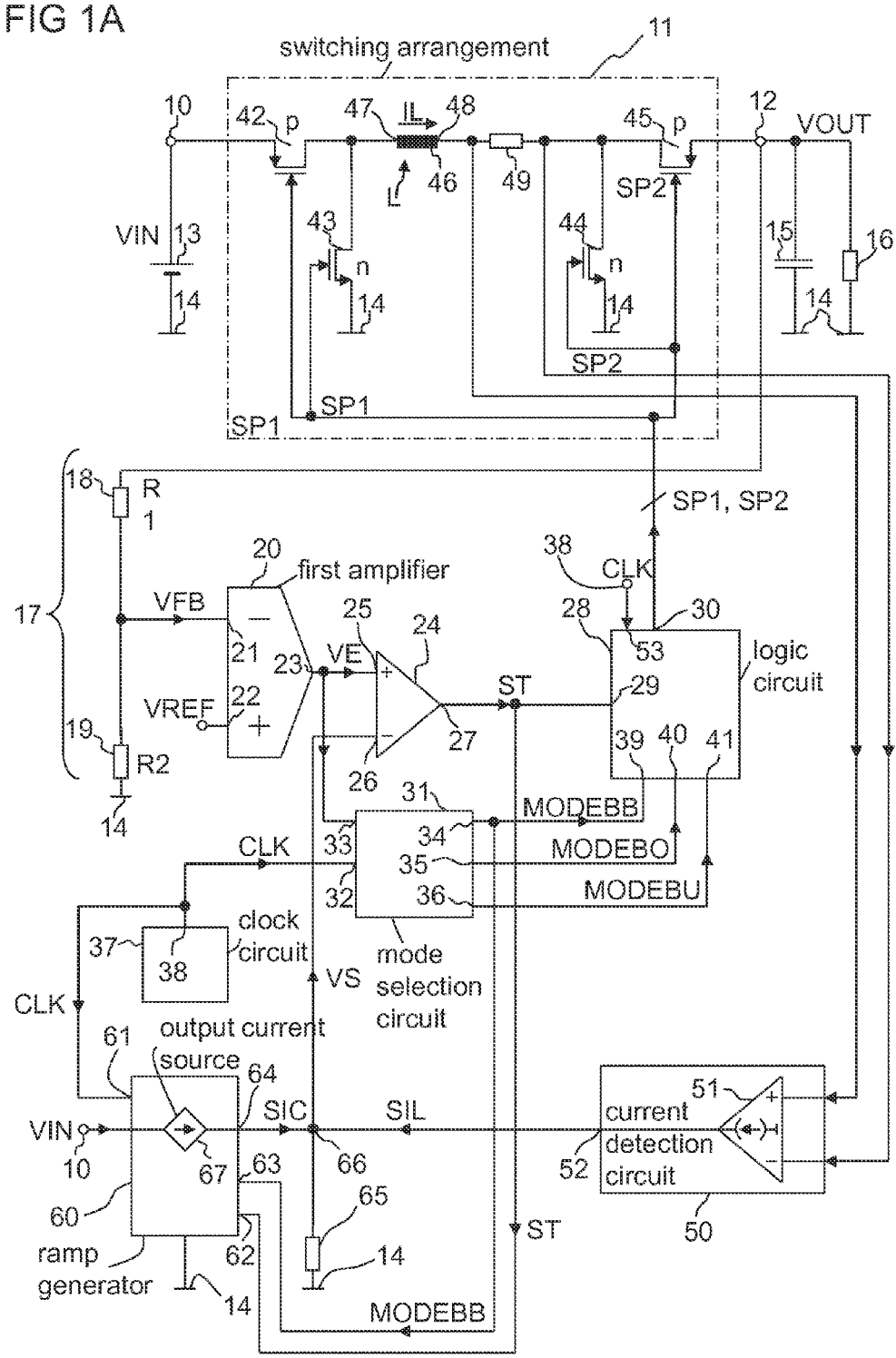
FIGS. 1A to 1C show an exemplary embodiment of a DC/DC converter arrangement and exemplary embodiments of a ramp generator of the invention.

FIG. 1A shows a first exemplary embodiment of a DC/DC converter arrangement according to the invention. The DC/DC converter arrangement comprises an input terminal 10, a switching arrangement 11 and an output terminal 12. The switching arrangement 11 couples the output terminal 12 to the input terminal 10. A voltage source 13 is arranged between the input terminal 10 and a reference potential terminal 14. An output capacitor 15 couples the output terminal 12 to the reference potential terminal 14. Furthermore, a load resistor 16, which represents a load driven by the DC/DC converter arrangement, is arranged between the output terminal 12 and the reference potential terminal 14. The DC/DC converter arrangement further comprises a voltage divider 17 which couples the output terminal 12 to the reference potential terminal 14 and has a first and a second voltage divider resistor 18, 19. The first and the second voltage divider resistors 18, 19 are connected in series between the output terminal 12 and the reference potential terminal 14. The DC/DC converter arrangement further comprises a first amplifier 20 with a first input 21 which is coupled to a tap between the first voltage divider resistor 18 and the second voltage divider resistor 19. The DC/DC converter arrangement additionally comprises a comparator 24 with a first input 25 which is coupled to an output 23 of the first amplifier 20. The DC/DC converter arrangement further comprises a logic circuit 28 with an input 29 which is connected to an output 27 of the comparator 24. An output 30 of the logic circuit 28 is connected to an input of the switching arrangement 11.

Logic circuit 28 can be implemented as the logic circuit 28 shown in FIG. 7 of co-pending and commonly owned U.S. patent application Ser. No. 12/666,973. It can also be implemented as a subcircuit of control circuit 7 shown in FIG. 5 of co-pending and commonly owned U.S. patent application Ser. No. 12/087,292.

Furthermore, the DC/DC converter arrangement comprises a mode selection circuit 31 with a first clock input 32 which is connected to an output 38 of a clock circuit 37. A first input 33 of the mode selection circuit 31 is coupled to the output terminal 12 via the first amplifier 20 and the voltage divider 17. Therefore, the first input 33 of the mode selection circuit 31 is connected to the output 23 of the first amplifier 20. The mode selection circuit 31 comprises a first and a second output 34, 35. The first output 34 of the mode selection circuit 31 is connected to a first mode input 39 of the logic circuit 28. Similarly, the second output 35 of the mode selection circuit 31 is connected to a second mode input 40 of the logic circuit 28. Furthermore, the mode selection circuit 31 comprises a third output 36 which is connected to a third mode input 41 of the logic circuit 28.

Mode selection circuit 31 can be implemented as mode selection circuit 31 shown in FIG. 5 of the above-mentioned U.S. patent application Ser. No. 12/666,973.

In addition, the switching arrangement 11 comprises a first, a second, a third and a fourth switch 42 to 45 and a coil 46. The coil 46 can also be named as an inductor. The first switch 42 couples the input terminal 10 to a first terminal 47 of the coil 46. The second switch 43 couples the first terminal 47 of the coil 46 to the reference potential terminal 14. Moreover, the third switch 44 couples a second terminal 48 of the coil 46 to the reference potential terminal 14. The fourth switch 45 couples the second terminal 48 of the coil 46 to the output terminal 12. The output 30 of the logic circuit 28 is coupled to each of the control terminals of the four switches 42 to 45. The switching arrangement 11 furthermore comprises a series resistor 49 which is connected in series to the coil 46. A first terminal of the resistor 49 is connected to the coil 46 and a second terminal of the resistor 49 is connected to the fourth switch 45. The first and the second terminals of the series resistor 49 are coupled to two inputs of a current detection circuit 50 comprised by the DC/DC converter arrangement. An output 52 of the current detection circuit 50 is coupled to a second input 26 of the comparator 24. The current detection circuit 50 comprises a further amplifier 51 which is coupled on its input side to the first and the second terminal of the series resistor 49. A non-inverting input terminal of the further amplifier 51 is connected to the first terminal and an inverting input terminal of the further amplifier 51 is connected to the second terminal of the series resistor 49. The further amplifier 51 is coupled on its output side to the second input 26 of the comparator 24 via the output 52 of the current detection circuit 50. The further amplifier 51 is implemented as an operational transconductance amplifier.

Moreover, the DC/DC converter arrangement comprises a ramp generator 60 with a first input 61 which is connected to the output 38 of the clock circuit 37. A second input 62 of the ramp generator 60 is connected to the output 27 of the comparator 24. A third input 63 of the ramp generator 60 is connected to the first output 34 of the mode selection circuit 31. The ramp generator 60 is additionally connected to the input terminal 10 and to the reference potential terminal 14. The ramp generator 60 comprises an output 64 which is coupled to the second input 26 of the comparator 24. In addition, the DC/DC converter arrangement comprises a first resistor 65 which couples the second input 26 of the comparator 24 to the reference potential terminal 14. Therefore, a node 66 between the first resistor 65 and the second input 26 of the comparator 24 is connected to the output 52 of the current detection circuit 50 and to the output 64 of the ramp generator 60.

The mode selection circuit 31 generates a Buck-Boost activation signal MODEBB and applies it to the third input 63 of the ramp generator 60 and to the first mode input 39 of the logic circuit 28 via the first output 34 of the mode selection circuit 31. Furthermore, a Boost activation signal MODEBO is provided by the mode selection circuit 31 and is applied to the second mode input 40 of the logic circuit 28 via the second output 35 of the mode selection circuit 31. In addition, the mode selection circuit 31 generates a Buck activation signal MODEBU at the third output 36. The Buck activation signal MODEBU is provided to the third mode input 41 of the logic circuit 28. The logic circuit 28 controls the switching arrangement 11. Therefore, the logic circuit 28 sets the mode of operation of the switching arrangement 11. The control of the mode of operation of the switching arrangement 11 depends on the activation signals provided to the logic circuit 28. The logic circuit 28 sets a Buck-Boost mode of operation of the switching arrangement 11 if the Buck-Boost activation signal MODEBB is set or sets a Boost mode of operation of the switching arrangement 11 if the Boost activation signal MODEBO is set. In a corresponding way, the logic circuit 28 sets the switching arrangement 11 in a Buck mode of operation if the Buck activation signal MODEBU is set. If one of the signals is set, it has a logical high level. A maximum of one of the three activation signals MODEBB, MODEBU, MODEBO has a logical high level at each point of time. Only one mode of operation is active in a clock cycle.

A supply voltage VIN is applied to the input terminal 10 via the voltage source 13. An output voltage VOUT is provided at the output terminal 12 by the switching arrangement 11. The clock circuit 37 provides a clock signal CLK at the output 38 of the clock circuit 37. The clock signal CLK is supplied to the first input 61 of the ramp generator 60. Moreover, the clock signal CLK is applied to the first clock input 32 of the mode selection circuit 31 and to a clock input 53 of the logic circuit 28. A feedback voltage VFB is generated depending on the output voltage VOUT by the voltage divider 17. The feedback voltage VFB is provided at the tap between the first and the second voltage divider resistor 18, 19. The feedback voltage VFB is provided to the first input 21 of the first amplifier 20, whereas a reference voltage VREF is provided to a second input 22 of the first amplifier 20. A difference between the feedback voltage VFB and the reference voltage VREF is amplified by the first amplifier 20 and provided in the form of an error voltage VE at the output 23 of the first amplifier 20.

The feedback voltage VFB can be approximately calculated according to the following equation:

$$VFB = VOUT \cdot \frac{R2}{R1+R2} = \gamma \cdot VOUT \text{ with } \gamma = \frac{R2}{R1+R2}$$

wherein VOUT is the value of the output voltage, R1 is a value of the first divider resistor 18, R2 is a value of the second divider resistor 19, and γ is a divider factor of the first voltage divider 17.

Since the first input 21 of the first amplifier 20 is designed as an inverting input and the second input 22 of the first amplifier 20 is designed as a non-inverting input, the error voltage VS can be approximately calculated according to the following equation:

$$VE = \beta \cdot (VREF - VFB) = \beta \cdot (VREF - \gamma \cdot VOUT),$$

wherein VREF is the reference voltage and β is an amplification factor of the first amplifier 20. A desired reference value VREF0 of the output voltage VOUT which shall be provided at the output terminal 12 can be approximately determined by the equation:

$$VREF0 = \frac{VREF}{\gamma},$$

wherein VREF is the reference voltage and α is the divider factor of the first voltage divider 17.

A comparator signal ST is generated depending on the error voltage VE. The error voltage VE is supplied to the first input 25 of the comparator 24, so that the comparator signal ST is provided at the output 27 of the comparator 24. The comparator signal ST is applied to the input 29 of the logic circuit 28. A first and a second control signal SP1, SP2 are provided by the logic circuit 28. The first and the second control signal SP1, SP2 depend on the comparator signal ST, the Buck-Boost activation signal MODEBB, the Boost activation signal MODEBO, the Buck activation signal MODEBU and the clock signal CLK. The first and the second control signals SP1, SP2 are generated by the logic circuit 28 and provided via the output 30 of the logic circuit 28 to the first to the fourth switch 42 to 45.

A coil current IL flows through the coil 46 and, therefore, also through the series resistor 49. Thus a voltage difference between the first and the second terminal of the series resistor 49 is generated which is provided to the current detection circuit 50. The further amplifier 51 amplifies the difference between the voltage at the first and the voltage at the second terminal of the series resistor 49 and provides a current signal SIL at the output 52 of the current detection circuit 50. An absolute value of the current signal SIL is linearly proportional to the coil current IL. The current detection circuit 52 provides the current signal SIL in the form of a current.

The ramp generator 60 generates a ramp signal SIC. The ramp signal SIC is also implemented in the form of a current. The ramp signal SIC and the current signal SIL flow through the first resistor 65 to the reference potential terminal 14 and generate a sense voltage VS which is applied to the second input 26 of the comparator 24. By virtue of the ramp generator 60, the sense voltage VS is increased and does not only depend on the current signal SIL. Therefore, the comparator signal ST is generated depending on the difference between the error voltage VS and the sense voltage VS according to the following equations:

$$ST=1 \text{ if } VE-VR=VE-R\cdot(SIL+SIC)>0$$

$$ST=0 \text{ if } VE-VR=VE-R\cdot(SIL+SIC)\leq 0,$$

wherein 1 represents the logical high level, 0 represents the logical low level, R is a resistance value of the first resistor 65, SIL is a value of the current signal and SIC is a value of the ramp signal. The comparator signal ST is applied to the second input 62 of the ramp generator 60 and the input 29 of the logic circuit 28.

The DC/DC converter arrangement can automatically set the three activation signals MODEBB, MODEBU, MODEBO via the mode selection circuit 31 without an external circuitry.

In an embodiment, the first and the fourth switch 42, 45 are designed as p-channel field-effect transistors and the second and the third switch 43, 44 are designed as n-channel field-effect transistors. A first terminal of the output 30 of the logic circuit 28 is connected to the control terminals of the field-effect transistors of the first and the second switch 42, 43. A second terminal of the output 30 is connected to the control terminals of the field-effect transistors of the third and the fourth switch 44, 45. The first control signal SP1 is applied to the control terminals of the field-effect transistors of the first and the second switch 42, 43 and the second control signal SP2 is applied to the control terminals of the field-effect transistors of the third and the fourth switch 44, 45.

The first amplifier 20 is implemented as a differential amplifier. The first amplifier 20 can be an instrumental amplifier. Alternatively, the first amplifier 20 can be an operational amplifier or an operational transconductance amplifier, abbreviated OTA.

In an alternative, not shown embodiment, the series resistor 49 is replaced by a connection line and the coil current IL is measured via a measurement of a current flowing through the first switch 42.

In an alternative embodiment which is not shown, one or two of the four switches 42 to 45 are replaced by a diode. For example, the second switch 43 and/or the fourth switch 45 can each be replaced by a diode.

The function of the devices and elements shown in FIG. 1A are further explained below together with FIGS. 3A to 3F.

Figure 1B:
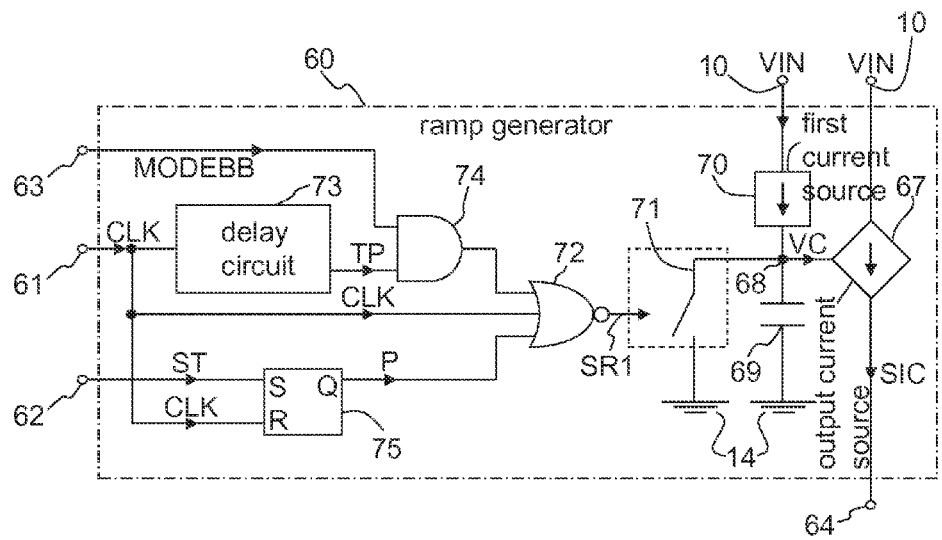

FIG. 1B shows an exemplary embodiment of a ramp generator which can be inserted in the DC/DC converter arrangement of FIG. 1A. The ramp generator 60 comprises an output current source 67 with an output which is connected to the output 64 of the ramp generator 60. The output current source 67 is also connected to the input terminal 10. The output current source 67 is implemented as a voltage controlled current source. Further on, the output current source 67 comprises a control input which is connected to a first node 68 of the ramp generator 60. The ramp generator 60 further comprises a ramp capacitor 69 which is arranged between the first node 68 and the reference potential terminal 14. Furthermore, the ramp generator 60 comprises a first current source 70 with an output which is connected to the first node 68. The first current source 70 is implemented as a programmable current source. The first current source 70 is additionally connected to the input terminal 10. In case the Buck-Boost activation signal MODEBB has a logical high level, the first current source 70 provides a current with a first value. In case the Boost activation signal MODEBO has a logical high level, the first current source 70 delivers a current with a second value. Correspondingly, the first current source 70 generates a current with a third value in case the Buck activation signal MODEBU obtains a logical high level. The ramp generator 60 furthermore comprises a discharging switch 71 which is arranged between the first node 68 and the reference potential terminal 14.

Additionally, the ramp generator 60 comprises a first logic gate 72 with an output which is connected to a control terminal of the discharging switch 71. The first logic gate 72 is implemented as a NOR-gate. The first logic gate 72 is coupled at the input side to the first, the second and the third input 61, 62, 63 of the ramp generator 60. A delay circuit 73 of the ramp generator 60 couples the first input 61 of the ramp generator 60 to the first input of the first logic gate 72. The delay circuit 73 is implemented as a monostable multi-vibrator. A second logic gate 74 of the ramp generator 60 is coupled on the input side to an output of the delay circuit 73 and to the third input 63 of the ramp generator 60. An output of the second logic gate 74 is connected to the first input of the first logic gate 72. The second logic gate 74 is implemented as an AND-gate. Furthermore, the ramp generator 60 comprises a flip-flop 75 with a data output which is connected to the second input of the first logic gate. A set input of the flip-flop 75 is connected to the second input 62 of the ramp generator 60 and a reset input of the flip-flop 75 is connected to the first input 61 of the ramp generator 60. The flip-flop 75 is implemented as a SR flip-flop. The third input of the first logic gate 72 is directly connected to the first input 61 of the ramp generator 60.

The comparator signal ST controls a first controllable duration td1. The comparator signal ST and the clock signal CLK are provided to the flip-flop 75 which generates a flip-flop signal P. At the start of each clock cycle, the delay circuit 73 is triggered by the clock signal CLK to generate a pulse with a second predetermined duration tp2. A delayed signal TP at the output of the delay circuit 73 is provided to the first input of the first logic gate 72 in case the Buck-Boost activation signal MODEBB is on a logical high level. The clock signal CLK is also provided to the third input of the first logic gate 72.

The first logic gate 72 provides a ramp control signal SR1 to the control input of the discharging switch 71. The ramp control signal SR1 depends on the clock signal CLK, the comparator signal ST and the Buck-Boost activation signal MODEBB. The ramp control signal SR1 controls a point of time for a start and a point of time for a stop of the ramp signal SIC. A ramp voltage VC at the first node 68 is provided across the ramp capacitor 69. The ramp voltage VC is controlled by the discharging switch 71. The ramp voltage VC is provided to the control terminal of the output current source 67, so that the ramp signal SIC depends on the ramp voltage VC. If the ramp control signal SR1 at the output of the first logic gate 72 has a logical high level, the discharging switch 71 is closed so that the ramp capacitor 69 is not charged. Therefore, a ramp voltage VC has a value of approximately 0 V.

In case the ramp control signal SR1 has a logical low level, the discharging switch 71 is open. In that case, the first current source 70 charges the ramp capacitor 69 and the ramp voltage VC and the ramp signal SIC rise. The charge at the ramp capacitor 69 and, therefore, also the ramp voltage VC the ramp signal SIC rise linearly.

The connection of the first input 61 of the ramp generator 60 to the third input of the first logic gate 72 ensures that the discharging switch 71 is closed at the start of each cycle for the duration of the pulse of the clock signal CLK. Therefore, the ramp voltage VC has a value of 0V at the start of each clock cycle.

The slope of the ramp voltage VC and, consequently, the slope of the ramp signal SIC depend on the mode of operation of the DC/DC arrangement. This is achieved since the current through the first current source 70 depends on the activation signals MODEBB, MODEBO, MODEBU. The wave form of the ramp signal SIC for the different modes of operation is shown in FIGS. 4A to 4C.

In an alternative embodiment, the first current source 70 provides a current with only one value. Therefore, the slope of the ramp voltage VC and the slope of the ramp signal SIC are independent of the mode of operation.

Figure 1C:
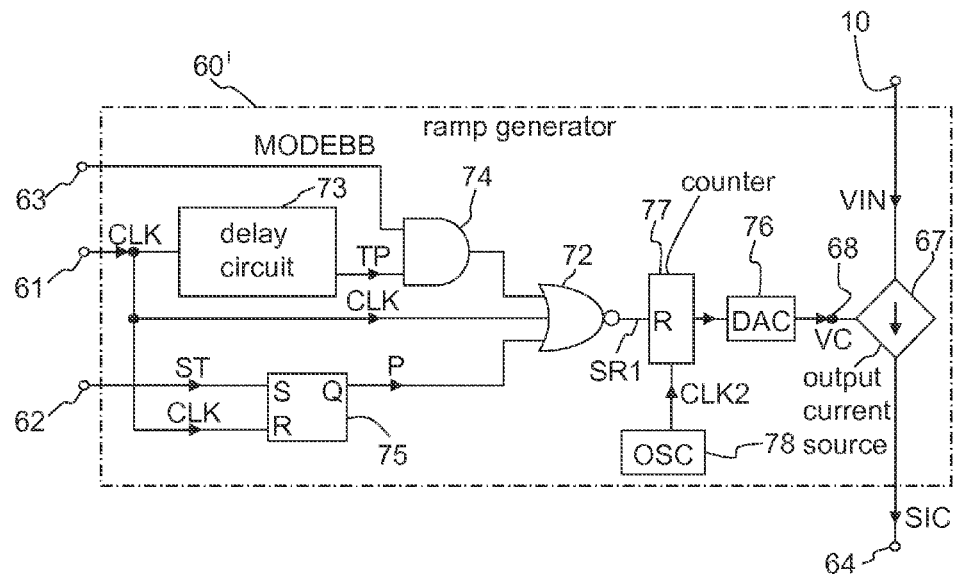

FIG. 1C shows an alternative embodiment of a ramp generator which can be inserted in the DC/DC converter arrangement according to FIG. 1A. The ramp generator 60' according to FIG. 1C comprises the first logic gate 72 and the output current source 67. The output of the first logic gate 72 is coupled to the control input of the output current source 67 in the ramp generator 60, 60' of FIGS. 1B and 1C. The ramp generator 60' comprises a digital-analog converter 76 with an output which is coupled to a control terminal of the output current source 67 via the first node 68. Furthermore, the ramp generator 60' comprises a counter 77 with an output which is coupled to an input of the digital analog converter 76. Additionally, the ramp generator 60' comprises a further clock circuit 78 that is coupled on the output side to a clock input of the counter 77. A reset input of the counter 77 is coupled to an output of the first logic gate 72.

The ramp control signal SR1 at the output of the first logic gate 72 resets the counter 77. In case the signal SR1 obtains a logical low level, the counter 77 counts the pulses of a further clock signal CLK2 starting with a number 0. The further clock signal CLK2 is provided by the further clock circuit 78 and has a higher frequency than the clock signal CLK. Thus the counter 77 generates a series of rising numbers at the output. The series of rising numbers is provided to the digital analog converter 76 which generates the ramp voltage VC as a linearly rising voltage. The ramp voltage VC is provided to the control input of the output current source 67 which generates the ramp signal SIC in the form a current.

FIG. 2A shows an alternative embodiment of a DC/DC converter arrangement. The DC/DC converter arrangement of FIG. 2A is a further development of the DC/DC converter arrangement of FIG. 1A. The DC/DC converter arrangement comprises a ramp generator 60" which is coupled to the first input 24 of the comparator 24. This is achieved by a coupling of the ramp generator 60" to the second input 22 of the first amplifier 20. The DC/DC converter arrangement comprises a second amplifier 80 with a first input 81 and a second input 82 which is connected to the output 64 of the ramp generator 60". An output of the second amplifier 80 is connected to the second input 22 of the first amplifier 20.

The ramp generator 60" provides the ramp signal SIC' in the form of a voltage. The ramp signal SIC' is applied to the second input 82 of the second amplifier 80. The reference voltage VREF is provided to the first input 81 of the second amplifier 80. The second amplifier 80 is implemented as a differential amplifier. Therefore, the second amplifier 80 generates a modified reference voltage VRE1 which depends on the difference of the reference voltage VREF and the ramp signal SIC' and is applied to the second input 22 of the first amplifier 20. In an arrangement according to FIG. 2A, the further amplifier 51 which is comprised by the current detection circuit 50 is designed as a differential amplifier. Therefore, the current signal SIL is provided by the current detection circuit 50 in the form of a voltage. The current signal SIL is directly provided to the second input 26 of the comparator 24 as the sense voltage VS.

Since the first amplifier 20 is connected at the output side to the first input 25 of the comparator 24, the comparator signal ST also depends on the ramp signal SIC'. The ramp signal SIC' provides a reduction of the error signal VE which is applied to the first terminal 25 of the comparator 24. According to the arrangement of FIG. 1A, the ramp signal SIC' provides an increase of the sense voltage VS which is applied to the second input 26 of the comparator 24.

Therefore, the DC/DC converter arrangements of FIGS. 1A and 2A can provide the comparator signal ST with approximately equal values.

Figure 2B:
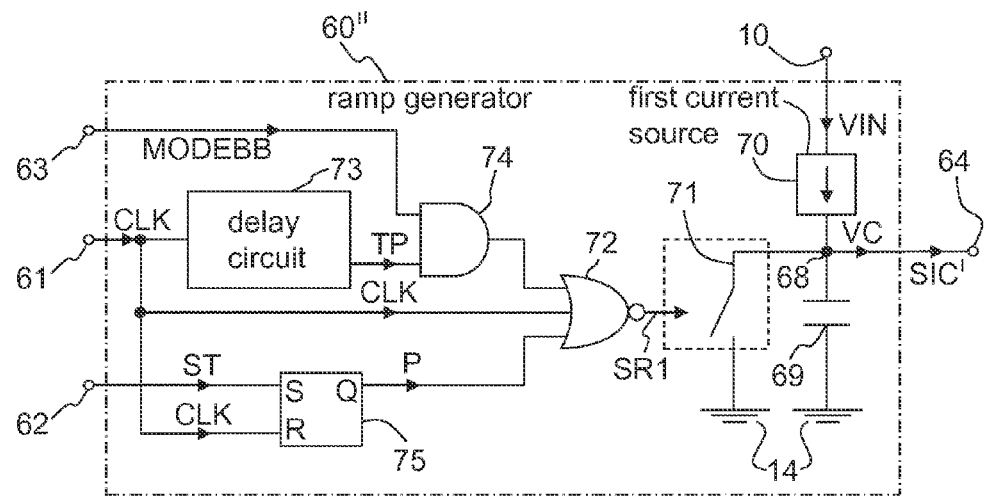

FIG. 2B shows an exemplary embodiment of a ramp generator which can be inserted in the DC/DC converter arrangement of FIG. 2A. The ramp generator 60" of FIG. 2B is a further development of the ramp generator 60 of FIG. 1B. The first node 68 between the first current source 70 and the ramp capacitor 69 is directly connected to the output 64 of the ramp generator 62". Therefore, the ramp signal SIC' is equal to the ramp voltage VC at the first node 68. The ramp signal SIC' is provided in the form of a voltage.

Figure 2C:
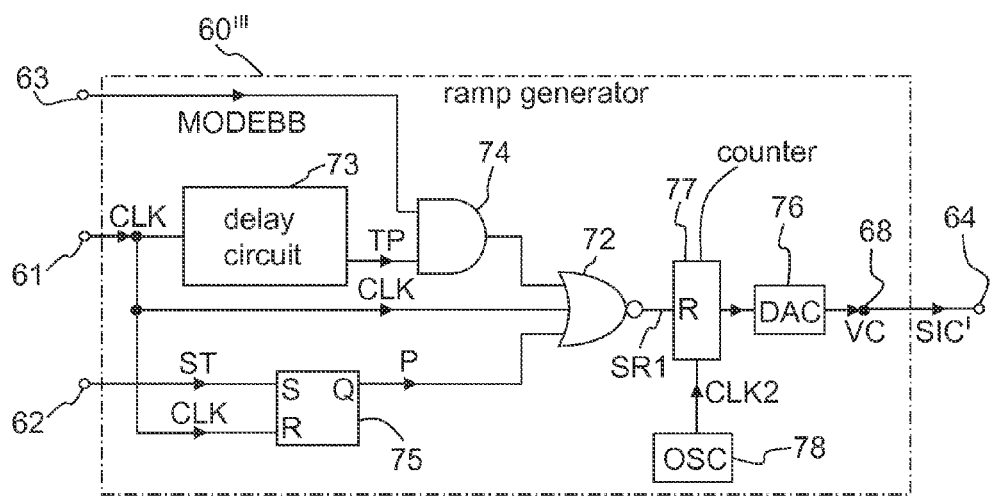

FIG. 2C shows an alternative exemplary embodiment of a ramp generator which can be inserted in the DC/DC converter arrangement of FIG. 2A. The ramp generator 60''' of FIG. 2C is a further development of the ramp generator 60' of FIG. 1C. The first node 68 is directly connected to the output 64 of the ramp generator 60'''. Therefore, the output of the digital analog converter 76 is coupled to the output 64 of the ramp generator 60'''. The ramp signal SIC' is approximately equal to the ramp voltage VC. Consequently the ramp signal SIC' is implemented in the form of a voltage.

Figures 3A, 3B:
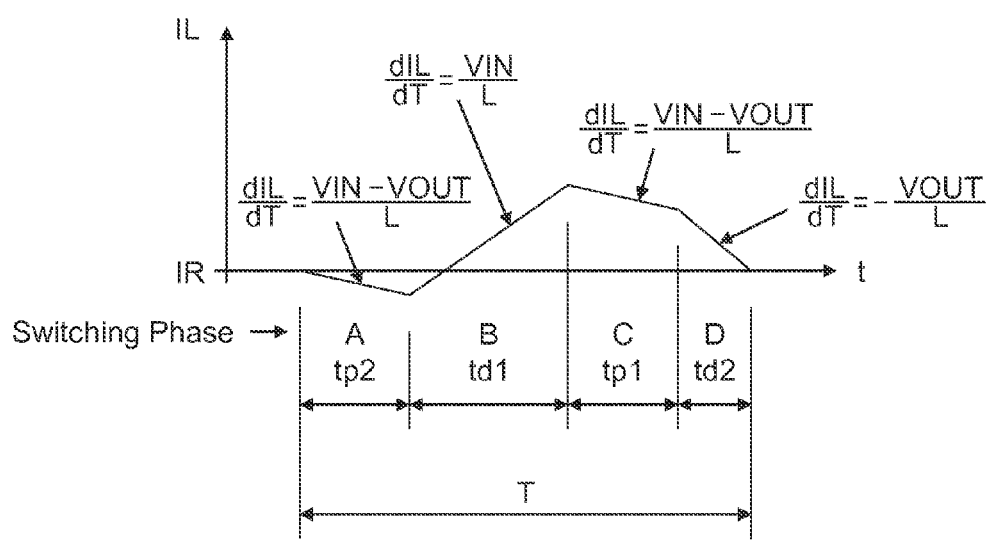

FIG. 3A shows an exemplary embodiment of a control sequence having four switching phases A, B, C, D for a conversion via a Buck-Boost mode of operation. The switching scheme of FIG. 3A can be applied to a circuit as shown in FIGS. 1A and 2A. The first and the fourth switch 42, 45 are in an on-state during a first switching phase A. The second and the third switch 43, 44 are in an off-state during the first switching phase A. The first and the third switch 42, 44 are in an on-state during a second switching phase B, while the second and the fourth switch 43, 45 are in an off-state. The first and the fourth switch 42, 45 are in an on-state during a third switching phase C, whereas the second and the third switch 43, 44 are in an off-state. The second and the fourth switch 43, 45 are in an on-state in a fourth switching phase D, while the first and the third switch 42, 44 are in an off-state. The second switching phase B lasts for the first controllable duration td1, while the fourth switching phase D lasts for a seconds controllable duration td2. The third switching phase C comprises a first predetermined duration tp1 and the first switching phase A comprises the second predetermined duration tp2. The first control signal SP1 is low during the first, the second and the third switching phase A, B, C and high during the fourth switching phase D. The second control signal SP2 is low during the first, the third and the fourth switching phase A, C, D, whereas the second control signal SP2 is high in the second switching phase B.

FIG. 3B shows the coil current IL schematically as a function of time t with reference to a reference current level IR during the sequence described in the table of FIG. 3A. A complete cycle having a cycle time T is shown. The cycle time T is the sum of the first and of the second predetermined duration tp1, tp2 and of the first and the second controllable duration td1, td2. During the first switching phase A, the coil current IL flows from the supply terminal 10 to the output terminal 12. The output voltage VOUT increases as the coil current IL charges the capacitor 15. During the first switching phase A, the slope of the coil current IL, that is the derivative with respect to time t of the coil current IL, equals the voltage drop across the coil 46 divided by an inductance L of the coil 46. The voltage drop across the coil 46 is the value of the supply voltage VIN reduced by the value of the output voltage VOUT in the first switching phase A. In the Buck-Boost mode, the output voltage VOUT is in the same voltage range as the supply voltage VIN, therefore, the slope is nearly zero during the first switching phase A. During the second switching phase B, the coil current IL increases because energy is supplied to the coil 46, as the first terminal 47 of the coil 46 is directly connected to the voltage source 13 and the second terminal 48 of the coil 46 is directly connected to the reference potential terminal 14 via the first and the third switch 42, 44, respectively. During the second switching phase B, the coil current IL rises with a slope which corresponds to the value of the supply voltage VIN divided by the inductance L.

In the third switching phase C, the first and the fourth switch 42, 45 are closed so that the first terminal 47 of the coil 46 is connected to the voltage source 13 and the second terminal 48 of the coil 46 is connected to the output terminal 12. The coil current IL is nearly constant in the third switching phase C because the slope of coil current IL is the voltage difference between supply voltage VIN and output voltage VOUT divided by the inductance L. During the third and the fourth switching phases C, D, the coil current IL charges the output capacitor 15. The coil current IL decreases in the fourth switching phase D because energy is supplied to the output terminal 12, including the output capacitor 15. The slope of the decrease of the coil current IL is defined by the negatived value of the output voltage VOUT divided by the inductance L. The switching phases A, B, C and D are repeated periodically to generate a stable output voltage VOUT. The output capacitor 15 will be charged by the coil current IL and is used as an energy supply for a load of the DC/DC converter arrangement represented by the load resistor 16 in FIGS. 1A and 2A.

The output capacitor 15 is advantageously charged during three of the four switching phases. It is an advantage that the Buck-Boost of operation comprises the first and the third switching phases A, C with durations which do not vary and are constant during the operation in a Buck-Boost mode. In addition, the Buck-Boost mode of operation comprises the second switching phase B with the first controllable duration td1 which can be varied to achieve a small value of the error voltage VE. The comparator signal ST triggers the end of the second switching phase B and thus controls the first controllable duration td1. The sum of the durations of the four switching phases A, B, C, D of the Buck-Boost mode is the cycle time T which is constant. Thus the last switching phase of a clock cycle, which is the fourth switching phase D, lasts for the second controllable duration td2 which can be derived by the values of the cycle time T, the first controllable duration td1 and the first and the second predetermined durations tp1, tp2.

FIG. 3C shows an exemplary control sequence for the Boost mode of operation of the DC/DC converter arrangement shown in FIGS. 1A and 2A. The control sequence comprises two switching phases, the first switching phase A and the second switching phase B of the sequence shown in the table in FIG. 3A. The two switching phases A, B are repeated periodically. During the second switching phase B, the first and the third switch 42, 44 are closed and, therefore, energy is supplied to the coil 46 from the voltage source 13. In the following first switching phase A, energy is provided to the output terminal 12 from the coil 46, because the first and the fourth switch 42, 45 are closed. The coil current IL can flow to the output capacitor 15 in the first switching phase A even if the output voltage VOUT is higher than the supply voltage VIN.

FIG. 3D shows the coil current IL during the Boost mode of operation with the sequence described in the table of FIG. 3C. During the second switching phase B, the coil current IL increases since the slope VIN divided by the inductance L is positive. During the first switching phase A, the coil current IL falls again. The second switching B lasts for a Boost duration tu in the Boost mode of operation. The comparator signal ST controls the Boost duration tu.

FIG. 3E shows an exemplary control sequence for down-conversion using a Buck mode of operation of the DC/DC converter arrangement shown in FIGS. 1A and 2A. For down-conversion, the first and the fourth switching phases A, D, already described in the table in FIG. 3A, are preferably used. During the first switching phase A, energy is provided by the voltage source 13 to the coil 46 and to the output capacitor 15 at the output terminal 12. During the fourth switching phase D, the voltage source 13 is decoupled from the coil 46 and energy is provided to the output terminal 12 by the coil 46 only.

FIG. 3F shows an example of the coil current IL versus time t with reference to the current reference level IR during the Buck mode of operation with the sequence described in the table of FIG. 3E. The coil current IL rises during the first switching phase A and falls during the fourth switching phase D. The first switching phase A during the Buck mode of operation lasts for a Buck duration td. The comparator signal ST controls the Buck duration td.

A cycle time T is set for the three modes of operation. The cycle time T and, therefore, a cycle frequency of the DC/DC converter arrangement advantageously is constant during the operation of the DC/DC converter arrangement in one mode of operation and is also constant over the three different modes of operation.

FIG. 4A shows an exemplary embodiment of the signals provided by an arrangement of FIG. 1A and a ramp generator of FIGS. 1B and 1C. FIG. 4A shows a Buck-Boost mode of operation, since a Buck-Boost activation signal MODEBB is set to a logical high level. FIG. 4A shows the clock signal CLK, the delayed signal TP at the output of the delay circuit 73, the flip-flop signal P, the ramp control signal SR1 and the ramp signal SIC at the output 64 of the ramp generator 60, 60'. In the first switching phase A the delayed signal TP is on a logical high level so that the ramp control signal SR1 is also set to a logical high level leading to a discharging of the ramp capacitor 69. In the second switching phase B, the clock signal CLK, the delayed signal TP and the flip-flop signal P have a logical low level, so that the discharging switch 71 is open and the ramp signal SIC rises. The Buck-Boost activation signal MODEBB is set to a logical high level and the Buck and the Boost activation signals MODEBU, MODEBO are on a logical low level. Thus the first current source 70 generates a current with the first value. During the third and the fourth switching phases C, D, the flip-flop signal P is on a logical high level, so that the ramp capacitor 69 is discharged and the ramp signal SIC is 0. A slope of the ramp signal SIC during the second switching phase B can approximately be calculated by the following equation:

$$\frac{dSIC}{dt} = mc1 = \frac{gc*ICH1}{C},$$

wherein mc1 is the slope of the ramp signal SIC versus time, gc is a transconductance of the output current source 67, ICH1 is the current value of the first current source 70 in case of a Buck-Boost mode of operation and C is a capacitance value of the ramp capacitor 69.

The ramp generator 60, 60', 60'', 60''' shown in the FIGS. 1B, 1C, 2B and 2C can be used in the Buck-Boost mode of operation, the Buck mode of operation, and the Boost mode of the operation. The clock signal CLK has a short duration. The duration of the clock signal CLK is long enough to discharge the ramp capacitor 69 shown in FIGS. 1B and 2B. The ramp capacitor 69 is discharged when the clock signal CLK has a high value, thus the ramp voltage VC has a value of 0 Volt. Once the clock signal CLK has a low value, the ramp capacitor 69 will be charged such that the ramp signal SIC starts. A rise of the ramp signal SIC continues until the comparator signal ST obtains a high value. In that case, the flip flop signal P has a high value such that the ramp signal SIC does not rise anymore, until the next cycle starts.

In the Buck-Boost mode of operation, only the duration of one switching phase B of four switching phases A, B, C, D is controlled and two switching phases A, C have a predetermined duration. Since a complete cycle comprising the four switching phases A, B, C, D has a constant duration, the duration for the fourth switching phase D is known when the value for controllable duration td1 is known. Less current flows if the ramp signal SIC is zero. The power consumption is reduced. If in the Buck-Boost mode, the ramp signal SIC would start at the beginning of the first switching phase A, the conversion would not work properly.

FIG. 4B shows an exemplary embodiment of the signals in a DC/DC converter arrangement and in a ramp generator of FIGS. 1A, 1B and 1C in a Boost mode of operation. Since the Buck-Boost activation signal MODEBB is on a logical low level, the signal at the first input of the first logic circuit 72 is also on a logical low level. The clock signal CLK is provided to the reset input of the flip-flop 75, so that the flip-flop signal P at the data output of the flip-flop 75 is on a logical low level during the second switching phase B. Therefore, the three signals at the three inputs of the first logical gate 72 are on a logical low level during the second switching phase B. As a consequence, the discharging switch 71 is open so that the ramp signal SIC rises. The Boost activation signal MODEBO is set to a logical high level and the Buck activation signal MODEBU is on a logical low level. Thus the first current source 70 generates a current with the second value. When the comparator signal ST has a logical high level, the ramp control signal SR1 at the output of the first logical gate 72 obtains a logical high level so that the ramp capacitor 69 is discharged and the ramp signal SIC has a value of 0 mA.

A slope of the ramp signal SIC during the second switching phase B in the Boost mode of operation can approximately be calculated by the following equation:

$$\frac{dSIC}{dt} = mc2 = \frac{gc*ICH2}{C},$$

wherein mc2 is the slope of the ramp signal SIC versus time, gc is the transconductance of the output current source 67, ICH2 is the current value of the first current source 70 in case of the Boost mode of operation and C is the capacitance value of the ramp capacitor 69.

In the Boost mode of operation, the ramp signal SIC only has a slope for the Boost duration to and has a value of zero for the further switching phase.

FIG. 4C shows an exemplary embodiment of signals in a Buck mode of operation in a DC/DC converter arrangement and a ramp generator of FIGS. 1A, 1B and 1C. The three signals at the three inputs of the first logical gate 72 are on a logical low level during the first switching phase A. Therefore, the discharging switch 71 is open so that the ramp signal SIC rises. The Buck activation signal MODEBU is set to a logical high level and the Buck-Boost and the Boost activation signals MODEBB, MODEBO are on a logical low level. Thus the first current source 70 provides a current with the third value. When the comparator signal ST has a logical high level, the ramp control signal SR1 obtains a logical high level so that the ramp capacitor 69 is discharged and the ramp signal SIC has a value of 0 mA in the fourth switching phase D.

A slope of the ramp signal SIC during the first switching phase A in the Buck mode of operation can approximately be calculated by the following equation:

$$\frac{dSIC}{dt} = mc3 = \frac{gc*ICH3}{C},$$

wherein mc3 is the slope of the ramp signal SIC versus time, gc is the transconductance of the output current source 67, ICH3 is the current value of the first current source 70 in case of the Buck mode of operation and C is the capacitance value of the ramp capacitor 69. In the buck mode of operation, the ramp signal SIC only has a slope for the Buck duration td.

The ramp signal SIC' supplied by the ramp generator 60'', 60''' of FIGS. 2B and 2C has an waveform which is equivalent to the waveform of the ramp signal SIC but is provided as a voltage.

According to FIGS. 4A to 4C, the discharging switch 71 is closed when the ramp control signal SR1 has a high value and is open if the ramp control signal SR1 has low value. The discharging switch 71 is open in exactly one switching phase during a cycle of a DC/DC conversion. However, the discharging switch 71 is open in at least one switching phase of a cycle of DC/DC conversion.

Figure 5A:
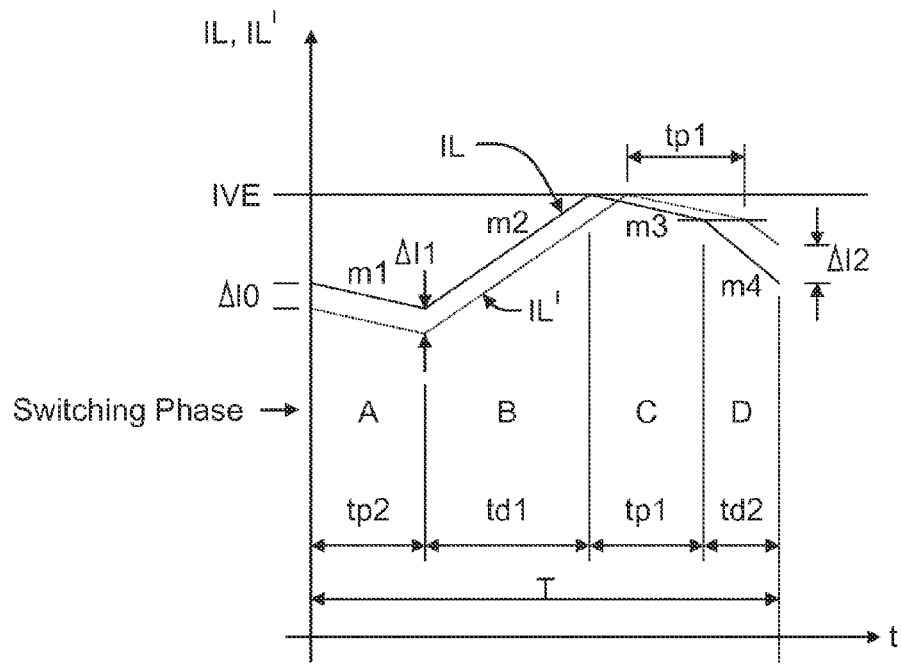
FIGS. 5A and 5B show exemplary embodiments of signals of a DC/DC converter arrangement in a Buck-Boost mode of operation with and without a ramp generator, respectively.

FIG. 5A shows exemplary signals of a DC/DC converter arrangement of FIG. 1A or FIG. 2A in case the ramp signal SIC has a value of 0. This is equivalent to a DC/DC converter arrangement without the ramp generator 60. FIG. 5A shows the coil current IL during a Buck-Boost mode of operation. It also shows a further coil current IL' which is generated due to an instability of the DC/DC converter arrangement without a ramp generator.

In the Buck-Boost Mode, a desired reference value VREF0 of the output voltage VOUT can approximately be controlled by the following equation:

$$VREF0 = \frac{tp1 + tp2 + td1}{tp1 + tp2 + td2} * VIN,$$

wherein VREF0 is the desired reference value of the output voltage, VIN is a value of the input voltage, td1 is a value of the first controllable duration, tp1 is a value of the first predetermined duration, tp2 is a value of the second predetermined duration and td2 is a value of the second controllable duration. The sum of the first and the second predetermined durations tp1, tp2 is constant. The value of the first controllable duration td1 and the value of the second controllable duration td2 control the output voltage VOUT. FIG. 5A shows an exemplary waveform of the coil current IL in the Buck-Boost mode of operation being controlled by the error voltage VE in a steady state. The coil current IL is shown for a continuous conduction mode. A current value IVE is a current which is proportional to the error voltage VE. By perturbing the coil current IL by a start difference ΔI0, a further coil current IL' is achieved. The further coil current IL' represents the coil current produced due to a momentary disturbance in the coil current IL. The coil current IL ramps with a first slope m1 which is equal to (VIN−VOUT)/L during the first switching phase A with the constant second predetermined duration tp2. The coil current IL then ramps with a second slope m2 which is equal to VIN/L during the first controllable duration td1. The first controllable duration td1 defines the switching phase B. Then the third switching phase C starts with the constant first predetermined duration tp1, in which the coil current IL ramps with a third slope m3 which is equal to (VIN−VOUT)/L. During the fourth switching phase D, the coil current IL ramps with a fourth slope m4 which equals to −VOUT/L until the end of the clock cycle.

The first switching phase A of the perturbed waveform of the further coil current IL' also has the same second predetermined duration tp2. The second switching phase B has a longer duration than the first controllable duration td1 of the coil current IL as can be seen graphically. The third switching phase C again obtains the constant first predetermined duration tp1. Since the cycle time T is constant, the fourth switching phase D has a reduced duration compared with the second controllable duration td2 of the coil current IL.

As can be seen in FIG. 5A, a first difference ΔI1 is equal to the start difference ΔI0 between the coil current IL and the further coil current IL'. Since the coil current IL and the further coil current IL' have the same first predetermined duration tp1, a ratio α can be calculated according to the following equation:

$$\alpha = \frac{\Delta I2}{\Delta I0} = \frac{\Delta I2}{\Delta I1} = \frac{m4}{m2},$$

wherein ΔI2 is a second difference at the end of the clock cycle, ΔI1 is the first difference at the end of the first switching phase A, ΔI0 is the start difference, m4 is the fourth slope and m2 is the second slope.

In order to achieve stability, the ratio α should be in the range of 0<α<1. Thus the second and the fourth slopes should fulfill the following equations:

$$m4 < m2 \text{ with } m4 = -\frac{VOUT}{L} \text{ and } m2 = \frac{VIN}{L}$$

This leads to the condition:

VOUT<VIN

Therefore, a Buck-Boost converter without a ramp generator can have sub-harmonic instability in the Buck-Boost mode if VIN<VOUT. The calculation also shows that the stability is independent of the first and the third slopes m1 and m3. Since the supply voltage VIN can be smaller than the output voltage VOUT, sub-harmonic oscillations can be possible in a Buck-Boost converter without ramp generator.

Figure 5B:
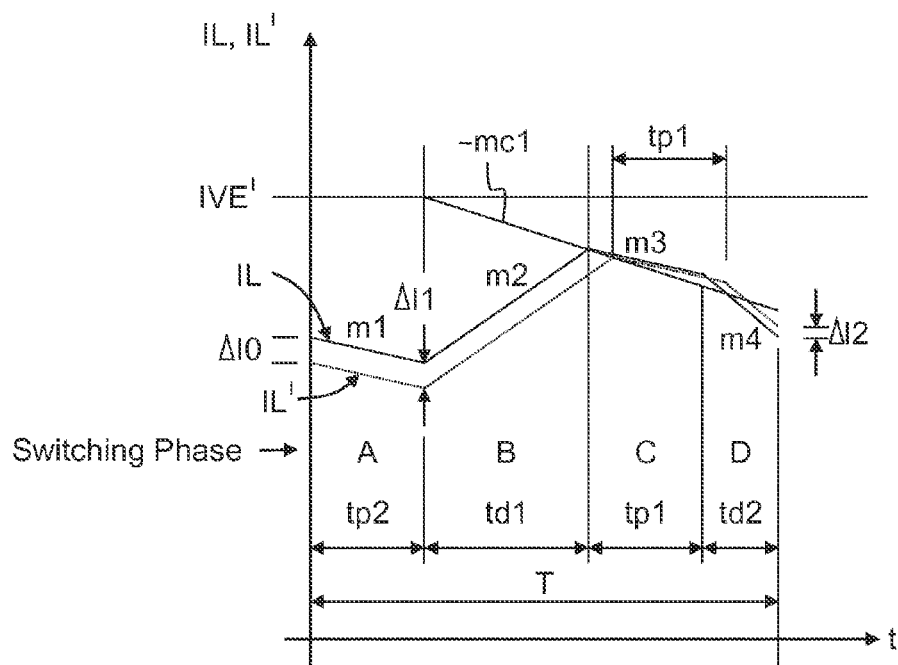

FIG. 5B shows exemplary signals of a DC/DC converter arrangement of FIG. 1A or 2A according to the invention. Stability can be achieved with the addition of a ramp signal SIC with a slope zero for the first switching phase A and with the slope mc1 for the second switching phase B to the current signal SIL. Alternatively, a ramp signal SIC with zero slope for the first switching phase A and with the slope mc1 for the second switching phase B can be subtracted from the current value WE of FIG. 5A to produce a further control value IVE' as shown in FIG. 5B. The ratio α can be calculated by the following equation:

$$\alpha = \frac{\Delta I2}{\Delta I0} = -\frac{m4 + mc1}{m2 + mc1} = -\frac{-\frac{VOUT}{L} + mc1}{\frac{VIN}{L} + mc1}$$

The ratio α obtains a maximum when the output voltage VOUT has a maximum and the supply voltage VIN has a minimum value. The ratio α should be in the range 0<α<1 to gain stability. Therefore, the slope mc1 of the ramp signal SIC can be calculated by the following equations:

$$\alpha = -\frac{-\frac{VOUT(max)}{L} + mc1}{\frac{VIN(min)}{L} + mc1} \text{ and } 0 < \alpha < 1,$$

wherein VOUT(max) is the maximum value of the output voltage, VIN(min) is the minimum value of the supply voltage, L is the inductivity of the coil 46 and α is the ratio.

This equation forms the basis for the selection of the compensation slope mc1 for the given values VIN(min) and VOUT(max) and given ratio α for the stability. The compensated further current value IVE' has the slope −mc1 only in the second switching phase B.

According to FIG. 3D, the sub-harmonic instability in the Boost mode of operation can be eliminated with a compensating ramp signal SIC with the slope mc2 which can be calculated by the following equation:

$$mc2 > -\frac{m6}{2} \text{ with } m5 = \frac{VIN}{L} \text{ and } m6 = \frac{VIN - VOUT}{L}$$

The slope mc2 is selected to be larger than a maximum value of −m6. Thus slope mc2 can be calculated by the following equation:

$$mc2 > -\frac{m6}{2} = -\frac{1}{2} * \frac{VIN(\min) - VOUT(\max)}{L}$$

Due to FIG. 3F, the sub-harmonic instability in a Buck mode of operation can be eliminated with a compensating ramp signal SIC with the slope mc3 which can be calculated by the following equation:

$$mc3 > -\frac{m8}{2} \text{ with } m7 = \frac{VIN - VOUT}{L} \text{ and } m8 = -\frac{VOUT}{L}$$

The slope mc3 is selected with respect to the maximum value of the output voltage VOUT according to the following equation:

$$mc3 > -\frac{m8}{2} = -\frac{1}{2} * \frac{VOUT(\max)}{L}$$

Since the current signal SIL is proportional to the coil current IL with a proportionality factor λ, the proportionality factor λ has to be taken into account for the implantation of the ramp generator 60, 60', 60", 60'''. This can be realized according to the following equation:

$$\lambda = \frac{SIL}{IL} = \frac{mc1real}{mc1} = \frac{mc2real}{mc2} = \frac{mc3real}{mc3},$$

wherein mc1, mc2 and mc3 are the slopes as calculated in the equations above and mc1real, mc2real and mc3real are the slopes which have to be provided by the ramp generator 60, 60', 60", 60'" for avoiding the instability in the Buck-Boost, the Boost and the Buck mode of operation respectively. The proportionality factor λ is equal to an amplification factor of the further amplifier 51 multiplied with a resistance value of the series resistor 49.

The DC/DC converter arrangement has three distinct modes of operation. The sub-harmonic instability conditions are different in the three modes. The ramp generator 60 advantageously achieves a compensation of the sub-harmonic instability in all three modes of operations.

Figure 6A:
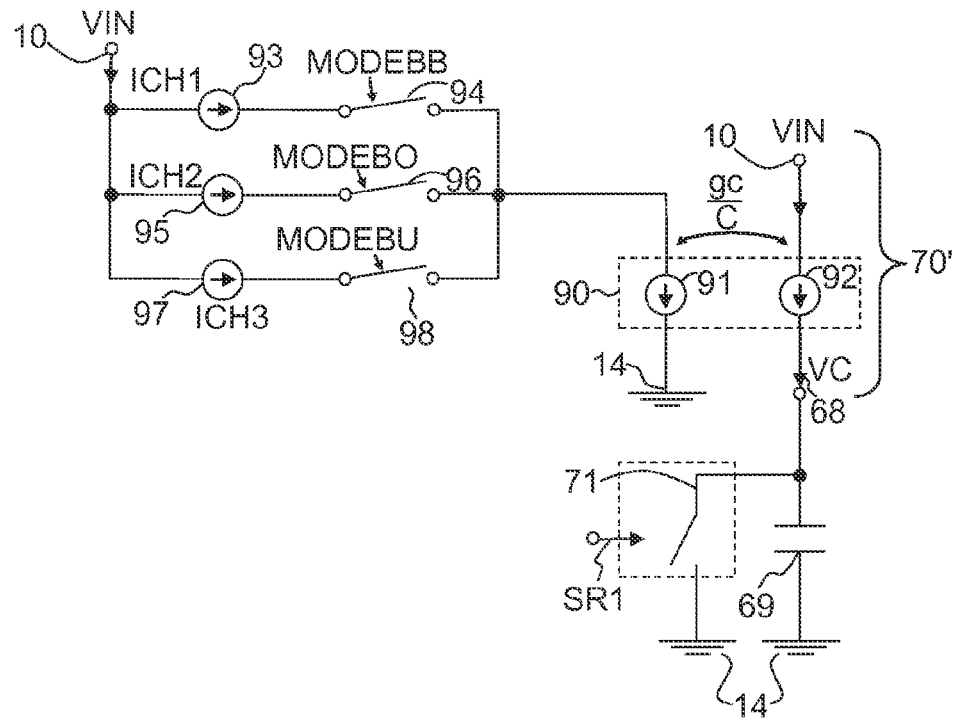
FIGS. 6A and 6B show exemplary embodiments of a circuit part of a ramp generator of the invention.

FIG. 6A shows an exemplary embodiment of a first current source 70' which can be inserted as the first current source 70 in the FIGS. 1B and 2B. Similar to the current source 70 in FIGS. 1B and 2B, the first current source 70' is arranged between the input terminal 10 and the first node 68. The first node 68 is connected to the output current source 67 according to FIG. 1B or to the output 64 of the ramp generator 60" according to FIG. 2B. The first current source 70' according to FIG. 6A comprises a current controlled current source 90. The first current source 70' comprises a Buck-Boost current source 93 and a Buck-Boost switch 94 which are connected in series. The series circuit of the Buck-Boost current source 93 and the Buck-Boost switch 94 is arranged between the input terminal 10 and an input node of the current controlled current source 90. Furthermore, the first current source 70' comprises a Boost current source 95 and a Boost switch 96 which are arranged in series between the input terminal 10 and the input terminal of the current controlled current source 90. In addition, the first current source 70' comprises a Buck current source 97 and a Buck switch 98 which are connected in series between the input terminal 10 and the input terminal of the current controlled current source 90. The current controlled current source 90 comprises an input path 91 and an output path 92. The input path 91 is connected between the input terminal of the current controlled current source 90 and the reference potential terminal 14. The output path 92 is connected between the input terminal 10 and the first node 68.

The Buck-Boost current source 93 provides a first current ICH1 and the Boost current source 95 provides a second current ICH2. Correspondingly, the Buck current source 97 generates a third current ICH3. The Buck-Boost activation signal MODEBB is applied to the Buck-Boost switch 94 and the Boost activation signal MODEBO is applied to the Boost switch 96. The Buck activation signal MODEBU is applied to the Buck switch 98. In case the DC/DC converter arrangement operates in the Buck-Boost mode of operation, the Buck-Boost switch 94 is closed and the other two switches 96, 98 are open. The first current ICH1 flows from the input terminal 10 via the input path 91 of the current controlled current source 90 to the reference potential terminal 14. The current controlled current source 90 converts the first current ICH1 into a current which flows through the output path 92 of the current controlled current source 90. The current controlled current source 90 has the gain gc/C. The current controlled current source 90 multiplies the current which flows through the input path 91 with the factor gc/C and provides the multiplied current through the output path 92. The multiplied current flows from the input terminal 10 through the output path 92 to the first node 68. The current in the output path 92 charges the ramp capacitor 69 in those switching phases in which the discharging switch 71 is open. Thus, the ramp voltage VC rises. If the discharging switch 71 is closed, than the ramp voltage VC has zero Volt.

If the DC/DC converter arrangement is in a Boost mode of operation, the Boost switch 96 is closed and, therefore, the second current ICH2 flows through the input path 91 of the current controlled current source 90. The second current ICH2 is amplified by the factor gc/C of the current controlled current source 90. The amplified current charges the ramp capacitor 69 in those switching phases, in which the discharging switch 71 is open. Thus the ramp voltage VC rises according to the flow of the second current IHC2. Similarly, the Buck switch 98 is closed and the Boost switch 96 as well as the Buck-Boost switch 94 are open in a Buck mode of operation of the DC/DC converter arrangement. Thus, the third current ICH3 flows from the input terminal 10 via the input path 91 of the current controlled current source 90 to the reference potential terminal 14. The current controlled current source 90 amplifies the third current ICH3 so that an amplified current flows through the output path 92 of the current controlled current source 90 and leads to an increase of the ramp voltage VC in case the discharging switch 71 is open.

Thus, by the use of the current sources 93, 95, 97 and corresponding switches 94, 96, 98 the ramp capacitor 69 can be charged by a current wherein a value of the current depends on the present mode of operation. Therefore, the slope of the ramp voltage VC depends on the present mode of an operation of the DC/DC converter arrangement. Thus, the ramp signal SIC, SIC' in FIG. 1B respectively FIG. 2B rises with a slope which depends on the mode of operation of the DC/DC converter arrangement. The ramp signal SIC, SIC' has the value of 0 if the discharging switch 71 is closed.

The switches 94, 96, 98, 105, 108, 111 have a low resistance if the corresponding digital control signal has a high value and have a high resistance value if the corresponding digital control signal has a low value.

Figure 6B:
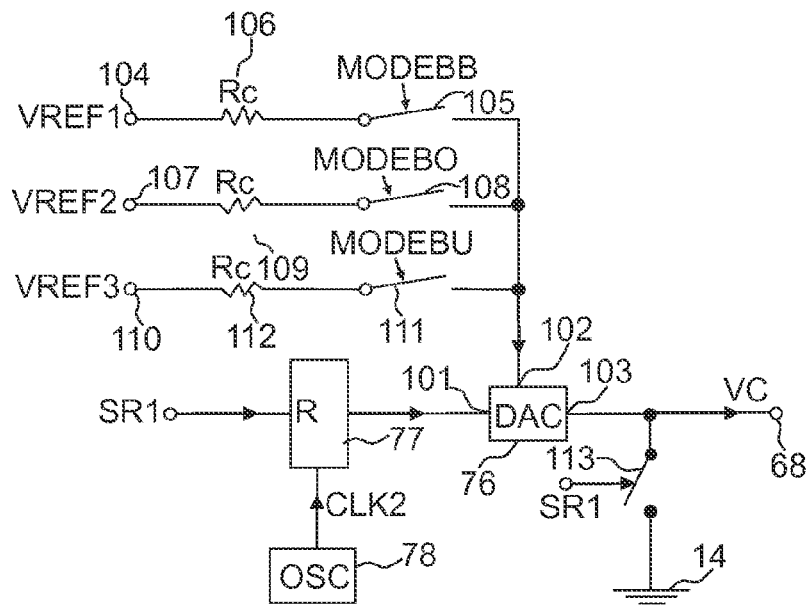

FIG. 6B shows an exemplary embodiment of a circuit part of a ramp generator which can be inserted in the ramp generator shown in FIGS. 1C and 2C. According to FIG. 6B, the digital-to-analog converter 76 is connected between the counter 77 and the first node 68. A first input terminal 101 of the digital-to-analog converter 76 is connected to an output terminal of the counter 77. An output terminal 103 of the digital-to-analog converter 76 is connected to the first node 68. The first node 68 is connected via an output switch 113 to the reference potential terminal 14. A control terminal of the output switch 113 is connected to the output terminal of the first logic gate 72 which is shown in FIGS. 1C and 2C. Furthermore, the digital-to-analog converter 76 comprises a reference input terminal 102. Moreover, the ramp generator comprises a first input 104 and an Buck-Boost switch 105. The Buck-Boost switch 105 is arranged between the first input 104 and the reference input terminal 102. A first resistor 106 is connected in series to the Buck-Boost switch 105 such that the series circuit is arranged between the first input 104 and the reference input terminal 102. In addition, the ramp generator comprises a second input 107 and a Boost switch 108. The Boost switch 108 is arranged between the second input 107 and the reference input terminal 102. A second resistor 109 is arranged in series to the Boost switch 108. Furthermore, the ramp generator 60' comprises a third input 110 and a Buck switch 111. The Buck switch 111 is arranged between the third input 110 and the reference input terminal 102. A third resistor 112 is arranged in series to the Buck switch 111.

A first reference voltage VREF1 is provided to the first input 104 and a second reference voltage VREF2 is provided to the second input 107. In addition, a third reference voltage VREF3 is supplied to third input 110. The Buck-Boost activation signal MODEBB is applied to the Buck-Boost switch 105 and the Boost activation signal MODEBO is applied to the Boost switch 108. The Buck activation signal MODEBU is applied to the Buck switch 111. As the DC/DC converter arrangement operates in the Buck-Boost mode of operation, the Buck-Boost switch 105 is closed and the Buck switch 108 as well as the Boost switch 111 are open. In this case, the first reference voltage VREF1 is applied to the reference input terminal 102 of the digital-to-analog converter 76. If the ramp control signal SR1 has a low value, the output switch 113 is open. In this case the ramp voltage VC is proportional to the reference voltage which is provided to the reference input terminal 102 and is also proportional to a digital signal at the output terminal of the counter 77.

If the ramp control signal SR1 has a high value, the output switch 113 is closed. Thus, the ramp voltage VC has a value of 0 V. The ramp control signal SR1 is also provided to the reset terminal of the counter 77. If the ramp control signal SR1 has a high value, the counter 77 is set to a reset value.

If the DC/DC converter arrangement is in a Boost mode of operation, the Boost switch 108 is closed and the Buck-Boost switch 105 as well as the Buck switch 111 are open. Therefore, the second reference voltage VREF2 is applied to the reference input terminal 102 of the digital-to-analog converter 76. If the DC/DC converter arrangement is in a Buck mode of operation, the Buck switch 111 is closed and the Buck Boost switch 105 as well as the Boost switch 108 are open. Therefore, the third reference voltage VREF3 is provided to the reference voltage input terminal 102. Thus, the reference voltage which is applied to the reference input terminal 102 depends on the mode of operation. The three reference voltages VREF1, VREF2, VREF3 have different values. The output node 68 is connected to the input current source 67 shown in FIG. 1C. In another embodiment, the first node 68 is connected to the output 64 of the ramp generator according to FIG. 2C. By the use of three different values for the three reference voltages VREF1, VREF2, VREF3, the slope of the ramp signal SIC, SIC' depends on the mode of operation and a high stability of the DC/DC voltage conversion is achieved.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A DC/DC converter arrangement, comprising:
    an input terminal to receive a supply voltage;
    an output terminal to provide an output voltage;
    a switching arrangement, comprising a coil, a first switch, a second switch, a third switch, and a fourth switch configured to provide the output voltage in a Buck-Boost mode of operation, a Buck mode of operation or a Boost mode of operation of the DC/DC converter arrangement, wherein (i) the first switch comprises a p-channel field-effect transistor and a control terminal of the first switch is configured to receive a first control signal, (ii) the second switch comprises an n-channel field-effect transistor and a control terminal of the second switch is configured to receive the first control signal, (iii) the third switch comprises an n-channel field-effect transistor and a control terminal of the third switch is configured to receive a second control signal, and (iv) the fourth switch comprises a p-channel field-effect transistor and a control terminal of the fourth switch is configured to receive the second control signal;
    a current detection circuit which is coupled to the switching arrangement for sensing a coil current;
    a comparator, comprising:
        a first input which is coupled to the output terminal,
        a second input which is coupled to an output of the current detection circuit, and
        an output which is coupled to the switching arrangement to control at least one of the first switch, the second switch, the third switch or the fourth switch; and
    a ramp generator which is coupled to the first or the second input of the comparator and which generates a ramp signal such that: a slope of the ramp signal depends on a mode of operation of the DC/DC converter arrangement, the ramp signal rises during one switching phase of a plurality of switching phases of the Buck-Boost mode of operation, and the ramp signal is constant during three switching phases of the plurality of switching phases of the Buck-Boost mode of operation.

2. The DC/DC converter arrangement according to claim 1, comprising:
    a voltage divider which couples the output terminal to a reference potential terminal; and
    a first amplifier, comprising:
        a first input which is coupled to an output of the first voltage divider,
        a second input, and
        an output which is coupled to the first input of the comparator.

3. The DC/DC converter arrangement according to claim 1, the ramp generator comprising:
    a first input to receive a clock signal;
    a second input which is coupled to the output of the comparator to receive a comparator signal; and
    a third input to receive a Buck-Boost activation signal.

4. The converter arrangement according to claim 1, wherein:
the first switch couples the input terminal of the DC/DC converter arrangement to a first terminal of the coil,
the second switch couples the first terminal of the coil to a reference potential terminal,
the third switch couples a second terminal of the coil to the reference potential terminal, and
the fourth switch couples the second terminal of the coil to the output terminal.

5. The DC/DC converter arrangement according to claim 1, comprising a logic circuit including:
an input which is connected to the output of the comparator, and
an output which is coupled to the switching arrangement for controlling the switching arrangement.

6. The DC/DC converter arrangement according to claim 3, the ramp generator comprising a first logic gate comprising:
a first, a second and a third input which are coupled to the first, the second and the third input of the ramp generator, and
an output to provide a ramp control signal which depends on the clock signal, the comparator signal and the Buck-Boost activation signal.

7. The DC/DC converter arrangement according to claim 5, comprising a mode selection circuit including:
a first input which is coupled to the output terminal,
a first output which is coupled to the logic circuit for providing a Buck-Boost activation signal
a second output which is coupled to the logic circuit for providing a Boost activation signal, and
a third output which is coupled to the logic circuit for providing a Buck activation signal.

8. The DC/DC converter arrangement according to claim 6, the ramp generator comprising:
a delay circuit with an input which is coupled to the first input of the ramp generator;
a second logic gate, comprising:
a first input which is coupled to the third input of the ramp generator,
a second input which is coupled to an output of the delay circuit, and
an output which is coupled to the first input of the first logic gate; and
a flip-flop, comprising:
a set input which is coupled to the second input of the ramp generator,
a reset input which is coupled to the first input of the ramp generator, and
a data output which is coupled to the second input of the first logic gate, wherein the first input of the ramp generator is coupled to the third input of the first logic gate.

9. The DC/DC converter arrangement according to claim 6, the ramp generator comprising:
a ramp capacitor which couples a first node to a reference potential terminal;
a discharging switch which couples the first node to the reference potential terminal and comprises a control terminal, the control terminal being coupled to the output of the first logic gate;
a first current source which is coupled to the first node; and
an output of the ramp generator at which the ramp signal is provided and which is coupled to the first node.

10. The DC/DC converter arrangement according to claim 6, the ramp generator comprising:
a digital-to-analog converter including:
an input which is coupled to an output of the first logic gate,
an output which is coupled to a first node, and
an output of the ramp generator at which the ramp signal is provided and which is coupled to the first node.

11. The DC/DC converter arrangement according to claim 9, the ramp generator comprising an output current source including:
a control input which is coupled to the first node, and
an output which is coupled to the output of the ramp generator.

12. The DC/DC converter arrangement according to claim 9, comprising a first resistor which couples the second input of the comparator to a reference potential terminal, wherein the output of the ramp generator is connected to the second input of the comparator.

13. The DC/DC converter arrangement according to claim 9, comprising a second amplifier including:
a first input to which a reference voltage is supplied,
a second input which is connected to the output of the ramp generator, and
an output which is coupled to the second input of the first amplifier.

14. A method for DC/DC conversion, comprising:
converting a supply voltage to an output voltage using a coil in a Buck-Boost mode of operation, a Boost mode of operation or a Buck mode of operation;
controlling a switching arrangement comprising the coil, a first switch, a second switch, a third switch, and a fourth switch, wherein the switching arrangement is configured to provide the output voltage, wherein (i) the first switch comprises a p-channel field-effect transistor and a control terminal of the first switch is configured to receive a first control signal, (ii) the second switch comprises an n-channel field-effect transistor and a control terminal of the second switch is configured to receive the first control signal, (iii) the third switch comprises an n-channel field-effect transistor and a control terminal of the third switch is configured to receive a second control signal, and (iv) the fourth switch comprises a p-channel field-effect transistor and a control terminal of the fourth switch is configured to receive the second control signal;
providing a current signal depending on a coil current;
generating a ramp signal such that a slope of the ramp signal depends on a mode of operation, wherein the ramp signal rises during one switching phase of a plurality of switching phases of the Buck-Boost mode of operation, and the ramp signal is constant during three switching phases of the plurality of switching phases of the Buck-Boost mode of operation;
comparing an error voltage which depends on the output voltage with a sense voltage which depends on the current signal and the ramp signal or comparing an error voltage which depends on the output voltage and the ramp signal with a sense voltage which depends on the current signal;
providing a comparator signal as a function of the comparison; and
controlling the Buck-Boost mode of operation of the conversion by the comparator signal.

15. The method according to claim 14, wherein the ramp signal is generated such that it rises in a ramp form during a switching phase of a plurality of switching phases of the Buck-Boost mode of operation and is constant during at least a further switching phase of the plurality of switching phases of the Buck-Boost mode of operation.

16. A DC/DC converter arrangement, comprising:
an input terminal to receive a supply voltage;
an output terminal to provide an output voltage;
a switching arrangement, comprising a coil and at least two switches to provide the output voltage in a Buck-Boost mode of operation, a Buck mode of operation or a Boost mode of operation of the DC/DC converter arrangement;
a current detection circuit which is coupled to the switching arrangement for sensing a coil current;
a comparator, comprising:
 a first input which is coupled to the output terminal,
 a second input which is coupled to an output of the current detection circuit, and
 an output which is coupled to the switching arrangement to control at least one of the at least two switches;
a ramp generator which is coupled to the first or the second input of the comparator and which generates a ramp signal such that a slope of the ramp signal depends on a mode of operation of the DC/DC converter arrangement, the ramp generator comprising:
 an output current source with an output which is coupled to an output of the ramp generator, wherein the output current source is configured as a voltage controlled current source, the output current source comprising a control input which is coupled to a first node of the ramp generator,
 a ramp capacitor which couples the first node to a reference potential terminal,
 a discharging switch which couples the first node to the reference potential terminal, and
 a first current source which is coupled to the first node, wherein the first current source is configured as a programmable current source such that the ramp capacitor is charged by a current, wherein a value of the current depends on the mode of operation such that the first current source provides a current with a first value when in the Buck-Boost mode of operation, a second value when in the Boost mode of operation, and a third value when in the Buck mode of operation.

17. A DC/DC converter arrangement, comprising:
an input terminal to receive a supply voltage;
an output terminal to provide an output voltage;
a switching arrangement, comprising a coil and at least two switches to provide the output voltage in a Buck-Boost mode of operation, a Buck mode of operation or a Boost mode of operation of the DC/DC converter arrangement;
a current detection circuit which is coupled to the switching arrangement for sensing a coil current;
a comparator, comprising:
 a first input,
 a second input which is coupled to an output of the current detection circuit, and
 an output which is coupled to the switching arrangement to control at least one of the at least two switches;
a first resistor which couples the second input of the comparator to a reference potential;
a ramp generator which is coupled to the second input of the comparator and which generates a ramp signal such that a slope of the ramp signal depends on the mode of operation of the DC/DC converter arrangement, wherein the ramp generator provides the ramp signal in the form of a current to a first terminal of the first resistor;
a voltage divider which couples the output terminal to the reference potential terminal; and
a first amplifier, comprising:
 a first input which is coupled to an output of the first voltage divider,
 a second input, and
 an output which is coupled to the first input of the comparator,
wherein the current detection circuit provides a current signal in the form of a current to the first terminal of the first resistor, and
wherein the ramp signal and the current signal flow through the first resistor to the reference potential and generate a sense voltage which is applied to the second input of the comparator.

18. A DC/DC converter arrangement, comprising:
an input terminal to receive a supply voltage;
an output terminal to provide an output voltage;
a switching arrangement, comprising a coil and at least two switches to provide the output voltage in a Buck-Boost mode of operation, a Buck mode of operation or a Boost mode of operation of the DC/DC converter arrangement;
a current detection circuit which is coupled to the switching arrangement for sensing a coil current;
a comparator, comprising:
 a first input which is coupled to the output terminal,
 a second input which is coupled to an output of the current detection circuit, and
 an output which is coupled to the switching arrangement to control at least one of the at least two switches; and
a ramp generator which is coupled to the first or the second input of the comparator and which generates a ramp signal such that: a slope of the ramp signal depends on the mode of operation of the DC/DC converter arrangement, the ramp signal rises during one switching phase of a plurality of switching phases of the Buck-Boost mode of operation, and the ramp signal is constant during three switching phases of the plurality of switching phases of the Buck-Boost mode of operation,
wherein the ramp generator provides the ramp signal in the form of a current and the current detection circuit provides a current signal in the form of a current.

* * * * *